United States Patent
Besnard et al.

(10) Patent No.: US 9,581,047 B2
(45) Date of Patent: Feb. 28, 2017

(54) BALL JOINT DEVICE FOR SUSPENDING A TURBINE ENGINE ON A PYLON OR SUSPENDING EQUIPMENT ON THE BODY OF THE TURBINE ENGINE

(71) Applicant: SNECMA, Paris (FR)

(72) Inventors: Maryline Besnard, Moissy-Cramayel (FR); Arnaud Laporte, Moissy-Cramayel (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/779,931

(22) PCT Filed: Mar. 21, 2014

(86) PCT No.: PCT/FR2014/050669
§ 371 (c)(1),
(2) Date: Sep. 24, 2015

(87) PCT Pub. No.: WO2014/154980
PCT Pub. Date: Oct. 2, 2014

(65) Prior Publication Data
US 2016/0076401 A1 Mar. 17, 2016

(30) Foreign Application Priority Data
Mar. 29, 2013 (FR) ...................... 13 52911

(51) Int. Cl.
*A47F 5/00* (2006.01)
*F01D 25/28* (2006.01)
(Continued)

(52) U.S. Cl.
CPC .............. *F01D 25/28* (2013.01); *B64D 27/26* (2013.01); *F16C 11/06* (2013.01); *F16C 11/106* (2013.01);
(Continued)

(58) Field of Classification Search
CPC .. B64D 27/18; B64D 27/26; B64D 2027/266; F01D 25/28
See application file for complete search history.

(56) References Cited

U.S. PATENT DOCUMENTS 6,296,203 B1 10/2001 Manteiga
2006/0122022 A1* 6/2006 Molenaar ................. B62D 1/16
475/159

FOREIGN PATENT DOCUMENTS

EP 0 744 338 A1 11/1996
FR 2 923 460 A1 5/2009
GB 2 490 781 A 11/2012

OTHER PUBLICATIONS

International Search Report mailed Aug. 1, 2014, issued in corresponding International Application No. PCT/FR2014/050669, filed Mar. 21, 2014, 2 pages.

* cited by examiner

*Primary Examiner* — Amy Sterling
(74) *Attorney, Agent, or Firm* — Christenson O'Connor Johnson Kindness PLLC

(57) ABSTRACT

Ball joint device for suspending a turbine engine from a pylon or suspending equipment on the body of the turbine engine, comprising a connecting rod, one end of which bears a ball and which is inserted between the two lugs of a clevis, the ball having a boring for the passage of a spindle having an axial boring for mounting a screw for clamping and axial locking the ball, the ball being axially locked by clamping between a bushing and a ring which carries removable means for axially retaining the ring with respect to the clevis during an operation of dismantling the device.

13 Claims, 2 Drawing Sheets

(51) Int. Cl.
  *B64D 27/26* (2006.01)
  *F16C 11/06* (2006.01)
  *F16C 11/10* (2006.01)
(52) U.S. Cl.
  CPC .... *B64D 2027/266* (2013.01); *F05D 2220/30* (2013.01); *F05D 2240/90* (2013.01)

BALL JOINT DEVICE FOR SUSPENDING A TURBINE ENGINE ON A PYLON OR SUSPENDING EQUIPMENT ON THE BODY OF THE TURBINE ENGINE

TECHNICAL FIELD

The present invention relates to a ball joint device for suspending a turbine engine on a pylon or suspending equipment on the body of a turbine engine.

PRIOR ART

A turbine engine is generally suspended on a pylon by means of a yoke which is fixed on the body of the turbine engine, in the region of the intermediate housing thereof. This yoke comprises clevises on which ends of connecting rods are articulated, the other ends of which rods are connected to means for suspending the turbine engine on the pylon. Each connecting rod is in general articulated on a clevis by a ball joint device.

In the current art, each connecting rod has an end which bears a ball joint and which is inserted between the two lugs of a clevis, the ball joint having a boring for the passage of a spindle, the ends of which pass through openings in the lug, said spindle having an axial boring for mounting a screw for fixing the assembly.

However, the devices of this type which are currently used are not entirely satisfactory, in particular when the yoke is made from titanium. In fact, when the yoke is made from titanium, the clevises thereof are very susceptible to wear which may be caused by the contact and the friction of parts of the device and also by the replacement of some of these parts during a maintenance operation. In addition, it is preferable for the ball joint to be immobilised axially in order to increase its service life, which is not always the case in the known devices.

In the application EP-A1-1 568 903, the ball joint and the clamping nut of the screw of the joint device are supported on a lug of the clevis, which is not admissible when a titanium clevis is used since a rotation of the ball joint or of the nut could cause friction wear on the clevis.

In the application EP-A1-2 058 229 the ball joint is not clamped axially since the screw supported on a shoulder of the screw. Moreover, the screw comprises an annular rim supported on one of the lugs of the clevis, which risks wear during operation. Although it is proposed to insert a plate between the rim and the clevis, this plate immobilises the rotation of the spindle, which is disadvantageous. In fact, preventing rotation of the spindle risks causing a concentration of stresses, which can lead to the spindle breaking.

The object of the present invention is in particular to provide a simple, efficient and economical solution to the aforementioned problems.

DESCRIPTION OF THE INVENTION

The invention proposes a ball joint device for suspending a turbine engine from a pylon or suspending equipment on the body of a turbine engine, comprising a first element, one end of which bears a ball and is inserted between the two lugs of a second element, the ball joint having a boring for the passage of a spindle, the ends of which pass through bushings mounted so as to be clamped in openings of the lugs, the device further comprising a screw or a nut co-operating with the spindle in order to ensure clamping and axial locking of the ball joint, characterised in that the ball joint is mounted so as to be clamped between a first of the aforementioned bushings and a first end of a cylindrical ring which is mounted around a part of the spindle and in the second of the aforementioned bushings, this ring being urged towards the ball joint by clamping the screw or the nut and having, at the first end thereof, removable means for axial retention of the ring with respect to the second element during an operation of dismantling the device.

According to the invention, a ring is engaged on the spindle and inside the second bushing, this ring being mounted by sliding and being clamped against the ball joint by means of the screw, in such a way as to axially immobilise the ball joint and thus increase the service life thereof.

When the device is dismantled, the screw, the spindle and the first element and the ball joint thereof are removed. The sliding ring can likewise be easily removed. When remounting the device, it is possible that an operator may forget to remount the sliding ring, which would cause substantial bending in the spindle and in the lugs during use, which can lead to breakage of the device. In order to avoid this problem, the present invention provides means for axial retention of the ring with respect to the second element, which makes it possible to render the ring captive with respect to the second element.

Nevertheless, in the likely case where the ring has become worn and has to be replaced during a maintenance operation, it would be necessary to remove the bushing in which the ring is engaged in order to be able to remove said ring. As the bushing is mounted and clamped in the opening of the lug, it would be necessary to destroy said bushing in order to withdraw it, which would necessarily result in a reworking of the dimensions of the opening of the lug and would therefore result in a significant additional cost. In order to solve this problem, the means for axial retention of the ring are removable, that is to say that, in the event that the ring has to be replaced, the retention means are removed and the ring is then extracted by axial sliding. These removable retention means also allow the ring to be mounted in the opening of the lug before or after the mounting of the bushing in this lug.

Advantageously, the removable axial retention means comprise a circlip which is removably mounted on the first end of the ring and is capable of being supported on the second of the aforementioned bushings in the event that the screw is unscrewed. This circlip comprises for example a split ring which is accommodated in an external annular groove of the first end of the ring.

The spindle may comprise an axial boring for mounting the screw, the head of which is intended to be supported on one end of the spindle. In a variant, the spindle is rigidly connected to one end of a threaded rod for screwing the nut intended to be supported on one end of the ring. In another variant, the spindle comprises, at one end, a tapped opening into which a screw is screwed, the head of which screw is intended to be supported on one end of the ring.

The ring preferably comprises, at the second end thereof, an internal annular rim, on the internal periphery of which the head of the screw or a nut is intended to be supported.

The device preferably comprises a third bushing mounted and clamped in the orifice of the lug in which the first bushing is mounted, these first and third bushings being coaxial and mounted side by side in the opening of the lug. Each of these bushings comprises an external annular rim for support on a lateral face of the lug of the second element. The rim of the first bushing is supported on one of the lateral faces of the lug and the rim of the third bushing is supported on the opposite lateral face of this lug.

This third bushing can be inserted between the aforementioned lateral face of the lug and an external annular rim of the spindle, this rim being urged axially towards the third bushing by clamping of the screw or of the nut, thus making it possible to protect the second element when said element is made of titanium.

The first and third bushings may be separated from one another by an axial clearance.

The first element may be a connecting rod and the second element may be a clevis, or vice versa.

The present invention also relates to a turbine engine, such as a turbojet engine or an aeroplane turboprop engine, characterised in that it is equipped with at least one device as described above.

DESCRIPTION OF THE DRAWINGS

The invention will be better understood, and other details, characteristics and advantages of the invention will become apparent upon reading the following detailed description, when taken in conjunction with the accompanying drawings, wherein.

DETAILED DESCRIPTION

Figure 1:
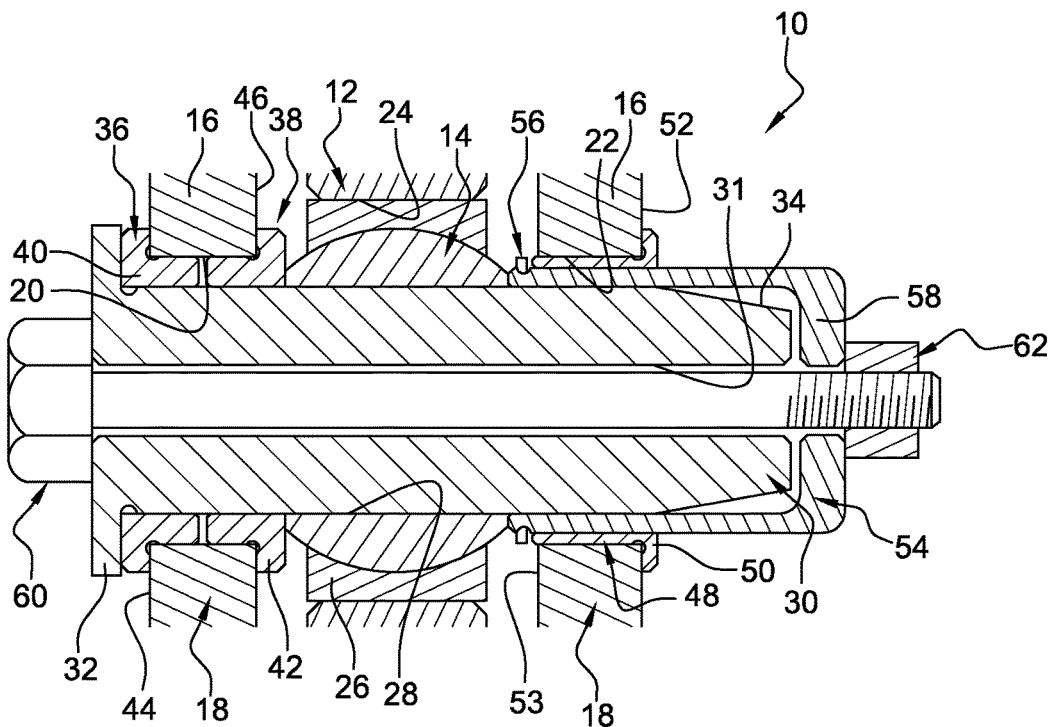
FIG. 1 is a schematic view in axial section of a ball joint device according to a representative embodiment of the invention.

FIG. 1 schematically shows a ball joint device 10 for suspending a turbine engine from a pylon or suspending equipment on the body of a turbine engine, this device comprising a connecting rod 12, one end of which bears a ball 14 and which is inserted between the two lugs 16 of a clevis 18.

In the case of suspending a turbine engine on a pylon, the clevis 18 forms part of a yoke which is preferably made of titanium. The clevis 18 is of the female type and the two lugs 16 thereof are flat and parallel to one another, these lugs 16 comprising coaxial openings 20, 22 having cylindrical internal walls.

The connecting rod 12 is connected to suspension means on the pylon and the end of said rod which can be seen in the drawing is flat and comprises an opening 24 having a cylindrical internal wall for mounting a cage 26 which is crimped in the opening and the internal spherical wall of which accommodates the ball joint 14 which is free to turn in the cage 26. The ball joint 14 comprises a cylindrical boring 28 through which a spindle 30 passes, which spindle has a cylindrical body, the ends of which, fit into the openings 20, 22 of the lugs 16.

The spindle 30 is hollow and comprises an axial boring 31. The spindle 30 comprises, at one of its ends, an external annular rim 32, the opposing end part 34 thereof having a substantially frustoconical shape in the example shown. This particular shape promotes the mounting of means for suspension of the turbine engine below the pylon. This mounting is carried out in particular by means of rotating boomerangs which are assembled on the turbine engine and by means of assembling the corresponding part on the pylon side. In fact, the turbine engine is mounted as far as the wing and the suspension means are then fixed, passing through the spindle of the boomerangs on the pylon part. The frustoconical part of the spindle makes it possible to position the assembly.

In the example shown, two bushings 36, 38 are mounted and clamped in the opening 20 of one 16 of the lugs (the bushing on the left in the drawing). These bushing 36, 38 are coaxial and substantially identical. They each comprise a cylindrical body connected at one end to an external annular rim 40, 42.

The bushing 36 is engaged in the opening 20 from one side (left-hand side) of the lug 16 in such a way that the rim 40 thereof is axially supported on the external lateral face 44 of the lug (the interior being situated at the side of the ball joint 14). In this case the rim 36 of the bushing is inserted between this lateral face 44 and the rim 32 of the spindle.

The bushing 38 is engaged in the opening 20 from the opposite side (right-hand side) of the lug 16 in such a way that the rim 42 thereof is axially supported on the internal lateral face 46 of the lug. In this case the rim 42 of the bushing 38 is intended to be supported on the ball joint 14 in order to axially lock said ball joint, as will be described in greater detail below.

The bushings 36, 38 are separated from one another by an axial clearance.

Another bushing 48 is mounted so as to be clamped in the opening 22 of the other lug 16 of the clevis, this bushing 48 being coaxial with the bushings 36, 38 and likewise comprising a cylindrical body connected at one end to an external annular rim 50. The bushing 48 is engaged in the opening 22 from one side of the lug 16 (right-hand side) in such a way that the rim 50 thereof is axially supported on the external lateral face 52 of the lug. The body of the bushing has an axial length or dimension greater than that of the opening 22, with the result that the free end thereof extends beyond the internal face 53 of the lug 16.

A cylindrical ring 54 is engaged in the bushing 48 and on the frustoconical end part 34 of the shaft, this ring having an axial length or dimension greater than that of the opening 22 and of the bushing 48, with the result that, in the mounting position shown in the drawing, the ends of the ring are situated at a distance from the lug 16 and from the bushing 48.

The ring 54 comprises, at the end thereof situated at the side of the ball joint 14, an external annular groove for receiving a split ring forming a circlip 56. The ring 54 comprises, at the opposite end thereof, an internal annular rim 58 which extends facing the end of the spindle 30, opposite the rim 32 thereof. The internal periphery of this rim 58 defines an opening which is aligned with the boring 31 of the spindle 30 for mounting a screw 60.

In the example shown, the screw 60 is engaged in the boring 31 of the spindle 30 by the end thereof having the external rim 32, in such a way that the head thereof is supported on this end. In this position, the free end of the screw extends axially beyond the aforementioned opening of the ring 54 and receives a nut 62 which is intended to be supported on the rim 58 of the ring.

The device 10 according to the invention may be mounted in the following manner: the bushing 48 is mounted so as to be clamped in the opening 22 of the lug, for example by friction fitting or with nitrogen; the bushings 36, 38 are then mounted so as to be clamped in the opening 20 of the lug, for example by friction fitting or with nitrogen; the ring 54 is engaged in the bushing 48 and then the circlip 56 is mounted in the groove of the ring 54; the end of the connecting rod 12 is engaged between the lugs 16 of the clevis 18 and then the spindle 30 is engaged in the bushings 36, 38, the ball joint 14 and the ring 54. The screw 60 is engaged in the boring 31 of the spindle 30 and the nut 62 is screwed to the free end of the screw. The clamping of the screw and of the nut results in the clamping and axial locking of the ball joint 14 between the bushing 38 and the ring 54.

During dismantling of the device 10, the nut 62 is unclamped and the screw 60 and the nut 62 are removed. The spindle 30 is removed, which releases the ball joint 14 and the connecting rod 12, which can likewise be removed. There is no risk of the ring 54 inadvertently coming out of the bushing 48 since, although said ring is slidably mounted in said bushing, said ring is axially retained on one side by means of the circlip 56 being in contact with the free end of the bushing 48 and on the opposite side by means of the free end thereof being in contact with the bushing 38 (because the length of the ring 54 is greater than the distance between the lugs). However, in the event that the ring 54 has to be removed and replaced due to wear, the circlip 56 can be removed manually or by means of a tool in order to be able to remove the ring from the side opposite the bushings 36, 38 by means of axial translation.

This device 10 is particularly advantageous since, in use, the risk of wear on the lugs 16 of the clevis 18, in particular when said clevis is made of titanium, is very limited. In fact, although the spindle 30 is not prevented from rotating, there is no risk of rotation thereof causing wear of the clevis since the bushings 36, 38 prevent direct contact of the spindle on the clevis. Moreover, the bushing 48 protects the clevis of the ring 54 which can turn during use. The ball joint 14 can no longer be supported on the clevis.

Figure 2:
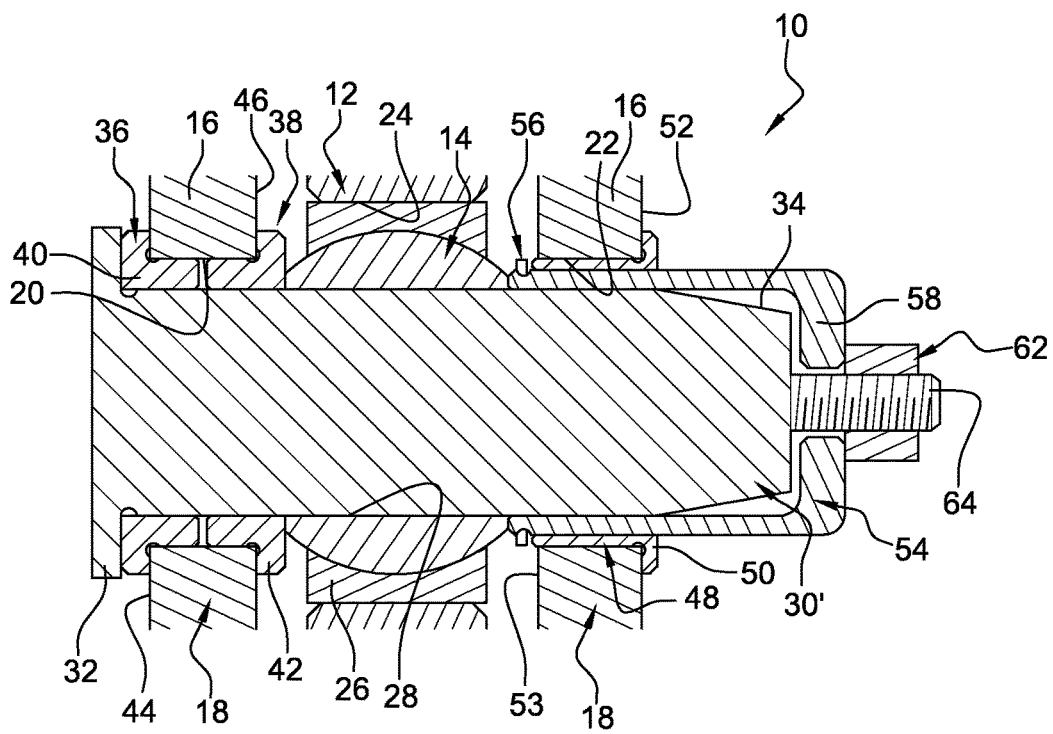
FIG. 2 is a schematic view in axial section of a ball joint device according to another representative embodiment of the invention.

The variant in FIG. 2 differs from the embodiment described above essentially in that the spindle 30' does not comprise an axial boring 31. The spindle 30' is rigidly connected to a threaded rod 64 which is connected to the end of the spindle situated at the side of the ring 54, this threaded rod 64 passing through the opening delimited by the rim 58 of the ring 54 and receiving a nut 62 intended to be supported on this rim 58.

Figure 3:
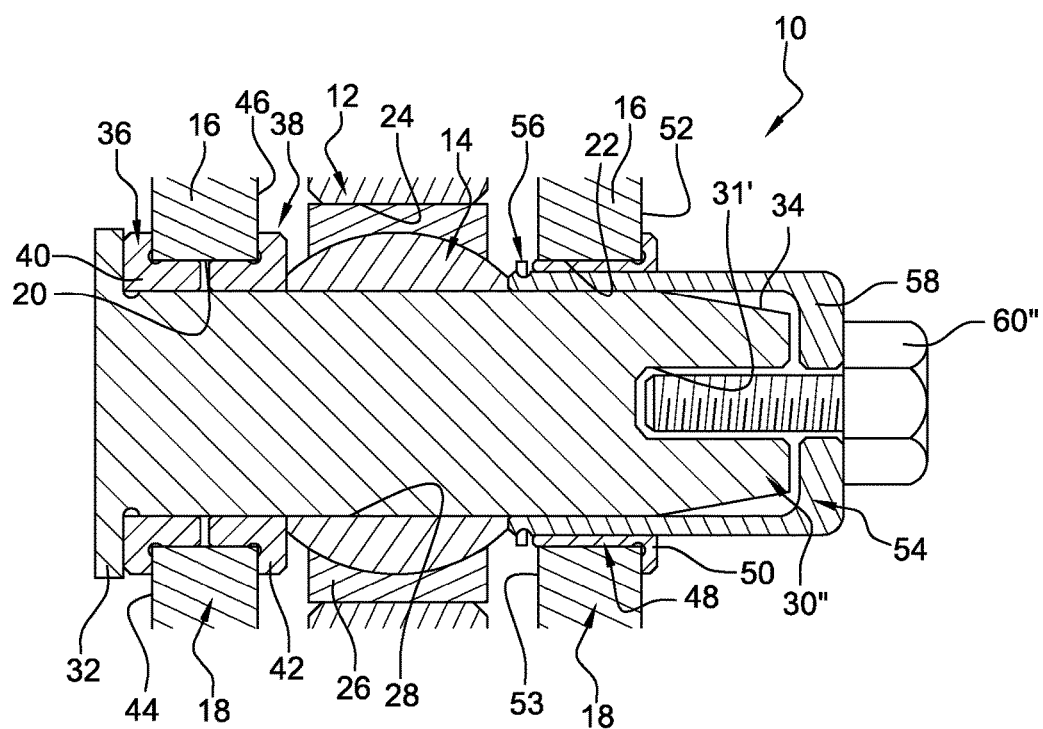
FIG. 3 is a schematic view in axial section of a ball joint device according to another representative embodiment of the invention.

The variant in FIG. 3 differs from the embodiment of FIG. 1 essentially in that the spindle 30" does not comprise an axial boring 31. This spindle 30" comprises a tapped opening 31' which opens at the end of the spindle which is situated at the side of the ring 54 and into which a screw 60' is to be screwed, which screw of course has a length which is less than that of the aforementioned screw 60, with the result that the head of the screw can be supported on the rim 58 of the ring 54.

The invention claimed is:

1. Ball joint device for suspending a turbine engine from a pylon or suspending equipment on the body of a turbine engine, comprising a first element, one end of which bears a ball and which is inserted between two lugs of a second element, the ball having a boring for the passage of a spindle, the ends of which pass through bushings mounted so as to be clamped in openings of the lugs, the device further comprising a screw or a nut co-operating with the spindle in order to ensure clamping and axial locking of the ball joint, wherein the ball joint is mounted so as to be clamped between a first of the aforementioned bushings and a first end of a ring, cylindrical in shape, the ring being mounted around a part of the spindle and engaged in a second of the aforementioned bushings, the second bushing comprising a rim axially supported on an external lateral face of the lug in which the second bushing is mounted and having a free end extending beyond an internal face of the lug, this ring passing through the second bushing and being urged axially towards and against the ball joint by clamping of the screw or of the nut, the ring having, at the first end thereof, removable means for axial retention of the ring with respect to the second element during an operation of dismantling of the device.

2. Device according to claim 1, wherein the removable axial retention means comprise a circlip which is removably mounted on the first end of the ring and is capable of being supported on the second of the aforementioned bushings in the event that the screw or the nut is unscrewed.

3. Device according to claim 2, wherein the circlip comprises a split ring which is accommodated in an external annular groove of the first end of the ring.

4. Device according to claim 1, wherein the spindle comprises an axial boring for mounting the screw, the head of which is intended to be supported on one end of the spindle, or the spindle is rigidly connected to one end of a threaded rod for screwing the nut intended to be supported on one end of the ring, or the spindle comprises, at one end, a tapped opening in which a screw is screwed, the head of which is intended to be supported on one end of the ring.

5. Device according to claim 1, wherein the ring comprises, at the second end thereof, an internal annular rim, on the internal periphery of which the head of the screw or a nut is intended to be supported.

6. Ball joint device for suspending a turbine engine from a pylon or suspending equipment on the body of a turbine engine, comprising a first element, one end of which bears a ball and which is inserted between two lugs of a second element, the ball having a boring for the passage of a spindle, the ends of which pass through bushings mounted so as to be clamped in openings of the lugs, the device further comprising a screw or a nut co-operating with the spindle in order to ensure clamping and axial locking of the ball joint, wherein the ball joint is mounted so as to be clamped between a first of the aforementioned bushings and a first end of a cylindrical ring which is mounted around a part of the spindle and, in a second of the aforementioned bushings, this ring being urged towards the ball joint by clamping of the screw or of the nut, and having, at the first end thereof, removable means for axial retention of the ring with respect to the second element during an operation of dismantling of the device, wherein the device comprises a third bushing mounted so as to be clamped in the opening of the lug in which the first bushing is mounted, these first and third bushings being coaxial and mounted side by side in the opening of the lug, each of these bushings comprising an external annular rim for support on a lateral face of the lug of the second element.

7. Device according to claim 6, wherein the third bushing is inserted between the aforementioned lateral face of the lug and an external annular rim of the spindle, this rim being axially urged towards the third bushing by clamping of the screw or of the nut.

8. Device according to claim 6, wherein the first and third bushings are separated from one another by an axial clearance.

9. Device according to claim 1, wherein the first element is a connecting rod and the second element is a clevis, or the first element is a clevis and the second element is a connecting rod.

10. Turbine engine comprising at least one ball joint device comprising a first element, one end of which bears a ball and which is inserted between two lugs of a second element, the ball having a boring for the passage of a spindle, the ends of which pass through bushings mounted so as to be clamped in openings of the lugs, the device further comprising a screw or a nut co-operating with the spindle in order to ensure clamping and axial locking of the ball joint, wherein the ball joint is mounted so as to be clamped between a first of the aforementioned bushings and a first end of a ring, cylindrical in shape, the ring being mounted around a part of the spindle and engaged in a second of the aforementioned bushings, the second bushing comprising a rim axially supported on an external lateral face of the lug in which the second bushing is mounted and having a free end extending beyond an internal face of the lug, this ring passing through the second bushing and being urged axially towards and against the ball joint by clamping of the screw or of the nut, the ring having, at the first end thereof, removable means for axial retention of the ring with respect to the second element during an operation of dismantling of the device.

11. Device according to claim 1, wherein the device comprises a third bushing mounted so as to be clamped in the opening of the lug in which the first bushing is mounted, these first and third bushings being coaxial and mounted side by side in the opening of the lug, each of these bushings comprising an external annular rim for support on a lateral face of the lug of the second element.

12. Device according to claim 11, wherein the third bushing is inserted between the aforementioned lateral face of the lug and an external annular rim of the spindle, this rim being axially urged towards the third bushing by clamping of the screw or of the nut.

13. Device according to claim 11, wherein the first and third bushings are separated from one another by an axial clearance.

* * * * *